Figure 3:
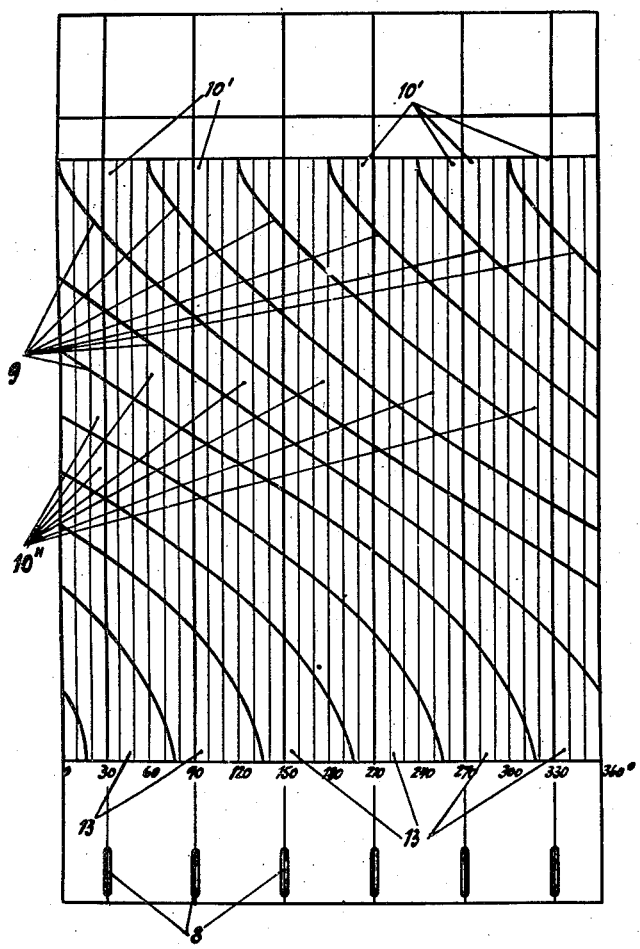

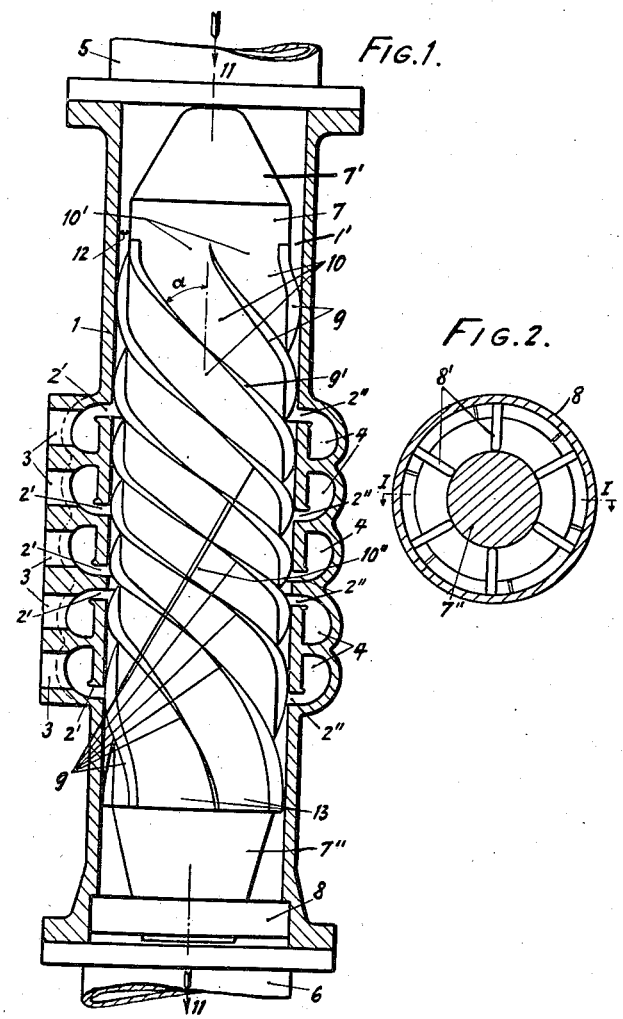

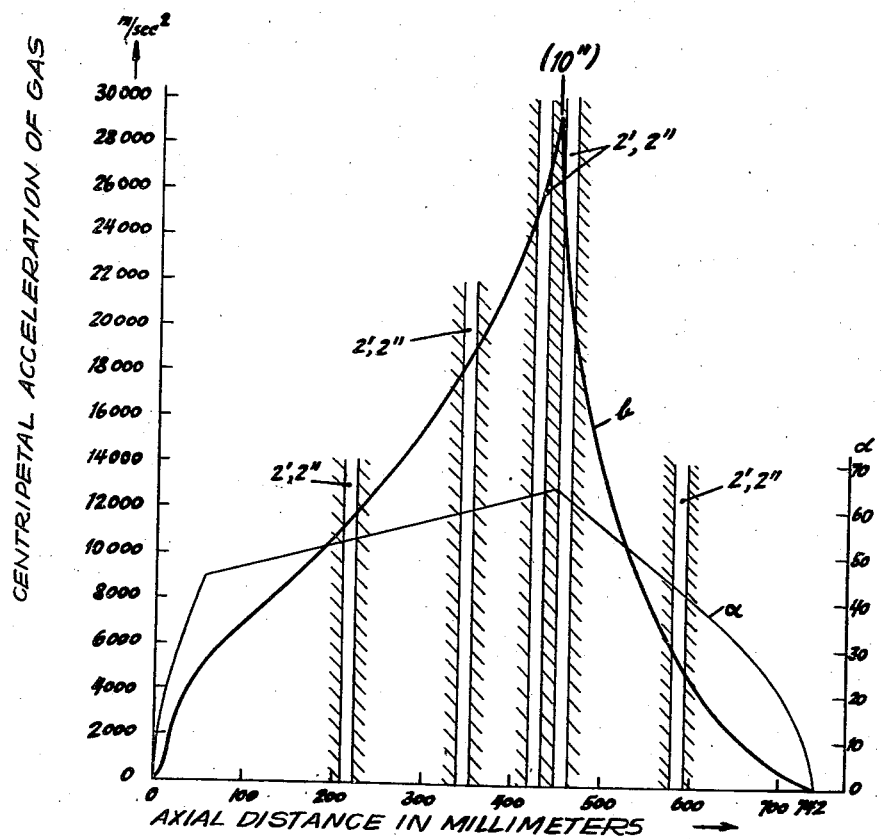

UNITED STATES PATENT OFFICE 2,413,324

GAS PURIFYING APPARATUS

Hans Theodor Holzwarth, Woodmere, N. Y., assignor to Holzwarth Gas Turbine Co., San Francisco, Calif., a corporation of Delaware Application June 8, 1940, Serial No. 339,449
In Germany June 9, 1939

2 Claims. (Cl. 183—79)

The present invention relates to the purification of gases by the removal of oil, water droplets, dust and other particles suspended therein.

It is the general object of the invention to provide a gas purifying device which is simple and compact in construction, highly efficient in operation, and inexpensive to manufacture, and also one which utilizes the available space with practically no waste, and possesses an extremely low resistance.

The apparatus of the present invention is of the type in which the particles preferably to be removed (in the case of dust particles, after a previous injection of atomized liquid, such as water, for weighting the particles) are subjected to the action of centrifugal force to cause them to be flung to the outer periphery of their path of travel, the particles being collected in suitable discharge openings arranged along such outer periphery.

The present invention is an improvement over the construction shown in the copending application of Hans Holzwarth, Serial No. 181,562, filed December 24, 1937, which issued as Patent No. 2,271,642 on February 3, 1942. As in the apparatus of such prior application, the separation of suspended particles is effected in the device of the present invention by causing the gas to flow along one or more channels of curvilinear form within which it is accelerated, the particles being thus hurled by centrifugal force to the outer periphery of their path, where they are collected and removed from the gas streams. However, whereas in the prior apparatus the pitch of the coiled channels, or the inclination of the channel side walls with respect to the axis about which the channels are coiled, remains constant, in the apparatus of the present invention the channels are coiled in such manner that their pitch, or the wall inclination, changes more or less constantly. Thus the pitch of the median lines of the channel or channels gradually decreases to an intermediate point and then gradually increases to or toward the discharge ends of the channels; while the inclination of the side walls with respect to the central longitudinal axis, on the other hand, increases to such intermediate point and then decreases. By the provision of a varying pitch, the curvilinear channels are each provided with an inlet section of gradually decreasing cross-section which terminates in a region of minimum cross-section, from which the outlet or diffuser section gradually increases in cross-section to the discharge end of the apparatus. These channels may be shaped along the lines of a Venturi nozzle, the inlet and diffusor sections, together with the intermediate portion of minimum cross-sectional area, all being comprised within the curvilinear or coiled channel.

Previous attempts to obtain a high degree of acceleration of the gases within a curvilinear channel by the provision of a region of reduced cross-section have been carried out by milling the channels along the periphery of a thick walled cylinder, the height of the side walls of the channels remaining constant, as disclosed, for example, in the above mentioned application. This resulted in relatively thick walls, which both increased the weight of the apparatus and reduced the effective peripheral flow area. Also, the cost of constructing such an apparatus by machining or even by casting supplemented by machining was quite high. Another method of creating the region of reduced cross-section was to coil the channels about a conical core member, the height of the side walls of the channels thus decreasing while the distance between the walls remained constant. This type of apparatus was likewise difficult and expensive to manufacture.

In accordance with the present invention, sheet metal strips of identical form and of uniform height are employed for defining the channels, the strips being welded, soldered or secured in any other suitable manner to a core member which is preferably of cylindrical form, the strips, which form the side walls of the channels, being secured in such manner to the core member that the angle which they make with the central longitudinal axis of such member gradually increases to the region at which it is desired that the cross-section of the channels shall be at a minimum, and then increases to, or approximately to, the discharge end of the device. This change in the inclination of the walls by itself produces the regions of minimum cross-section in the coiled channels which are necessary for effecting increase in the velocity of the gases. By such arrangement, a highly efficient Venturi effect is produced, while at the same time, practically the whole annular space between the core member and its external housing is available for the flow of gases, the thin side walls occupying very little space.

My apparatus may thus be regarded as consisting essentially of one or more thin-walled Venturi-like tubes coiled with first a decreasing and then an increasing pitch, the region of minimum cross-section being at the point of transition.

The change in pitch of the channel or channels not only effects the desired gradual decrease and subsequent increase in the flow cross-section, but at the same time causes a decrease in the radius of curvature of the channels in the region of minimum cross-section. This contributes to the attainment of an extraordinarily high degree of acceleration of the gas, as will be explained more in detail hereinbelow.

A satisfactory form of the invention is shown by way of illustration on the accompanying drawings, wherein Fig. 1 shows a vertical section through an apparatus constructed in accordance with the invention, the section being taken along the line I—I of Fig. 2;

Fig. 2 is an end view of the spider frame upon which the core member is seated;

Fig. 3 represents the development of the surface of the core member and shows the change in the inclination of the sheet metal side walls of the channels or, what is the same thing, the change in the pitch of the coiled channels, and the resulting changes in cross-section of the channels; and Fig. 4 illustrates graphically the changes in the angle of inclination of the channel side walls (projected against the longitudinal axis of the core member) along the length of the core body, measured in the direction of the longitudinal axis; and shows also the centripetal accelerations occurring in the coiled channels in dependence upon the changes in such angle.

As shown in Fig. 1, my improved gas purifying apparatus comprises an outer housing 1 provided with discharge openings 2', 2'' for the particles being separated, as will be explained hereinbelow, the particles collecting in the annular chambers 4 and flowing off through the discharge conduits 3. The housing 1 is connected at one end to a tubular member 5 through which the gases to be treated are fed thereto. Where the gases are to be freed from dust particles, the latter may be weighted with water droplets in any suitable manner; thus the tube 5 may contain or be shaped in the form of a gas expansion nozzle and be provided with injection nozzles for the wash liquid, as disclosed in the above-mentioned patent. At its other end the housing is connected to a tubular section 6, which leads off the purified gas. The apparatus shown in Fig. 1 is designed to be supported with its axis horizontal, the discharge openings 2' being at the lower crown line. The openings 2' and 2'' and the discharge conduits 3 can, however, be modified in an obvious manner to enable the device to be used in the upright position.

In the housing 1, there is located a core member 7 of smaller external diameter than the internal diameter of the housing, so as to provide an annular space 1' therebetween. The core member is supported against the flow pressure of the gases entering at 5 by an annular spider frame 8 provided with spaced ribs 8' forming a seat for the conical end 7'' of the core member. The ribs 8' are widely spaced as shown in Fig. 2, so that no resistance is offered to the flow of the gases passing through the housing 1. A conical section 7 at the inlet end of the core member aids in distributing the gases to the annular space 1', and also effects gradual increase in the velocity of the gases as they approach such annular space 1'.

The present invention is concerned with the manner in which the annular space 1' is divided into a number of channels within which the velocity of the gas streams is increased and likewise the centrifugal forces acting upon the particles to be removed. Increase in the velocity of the gases requires that the cross-section of the channels be reduced, preferably intermediate their ends. According to the present invention, the core member 7 is provided with a plurality of sheet metal strips 9 which are united therewith by soldering, welding, or in any other suitable manner, so that separate channels 10 are formed. The height of the metal strips is such that a substantially gas-proof contact with the inner surface of the housing 1 is established, the housing forming the outer wall of all of the channels. These sheet metal strips constitute the channel side walls and are identical in construction. Whereas, heretofore, the channels, i. e. the median lines of the channels, were given a uniform pitch, in accordance with the present invention, the sheet metal walls 9 are so mounted upon the member 10 that their inclination with respect to the longitudinal axis 11—11 of the member 10 varies along the length of such member. As can be seen from Figs. 1 and 3, this inclination, which is indicated by way of example by the angle α in Fig. 1 between the sheet metal strip 9' and the longitudinal axis 11—11, increases continuously from the inlet end portion 10', the depth of the channel, indicated at 12, and measured in the radial direction with respect to the said axis, remaining unchanged. The increase in the mentioned angle continues to the region of narrowest channel cross-section, indicated approximately at 10'' and from such point, the inclination gradually decreases to the discharge end portions 13 of the channels. The pitch of the several channels (6 channels are present in the construction illustrated) thus decreases to the region of minimum cross-section and then again increases to the discharge end.

The curve representing the angle α in Fig. 4, wherein the abscissae represent distances along the longitudinal axis of the apparatus measured from the inlet end, shows clearly that by reason of the sharp initial curvature of the sheet metal strips 9, such angle increases very rapidly to a value of about 45° and thereafter more gradually to about 65°. In the diffusor section of the channels, it decreases very rapidly.

It will be noted that the angularity of the median lines of the channels with respect to the longitudinal axis continues to increase beyond the inlet portion 10', and in fact up to a region approximately midway between the ends of the channels, there preferably being discharge openings both in advance of and beyond the region of minimum channel cross section, as will be explained below in connection with Fig. 4. It will also be observed that my improved apparatus can be made of such small axial length that the angular dimension of each complete channel is approximately only about 360°, that is, only about one complete turn. From this fact, the extraordinary compactness of the illustrated structure will be more readily realized.

The variation in the pitch of the walls 9 not only brings about automatically the necessary reduction in the cross-section of the channels and a corresponding increase in the velocity of the gases and in the centrifugal forces acting on the particles to be removed, but produces a still further result which practically doubles the efficiency of the apparatus as compared with known devices. An idea of the surprising results attainable with the apparatus of the present invention will be gained from the fact that it is possible to secure in such apparatus without difficulty centripetal accelerations of the order of about 3000 times the acceleration of gravity.

This additional result is due to the reduction in the effective radius of curvature which results from the decrease in the pitch of the channels. As is known, the centripetal acceleration to which a particle of matter is subjected is proportional on the one hand to the square of its velocity, while on the other hand it stands in inverse relationship to the radius of curvature of the path which it describes at the moment under consideration. It would therefore appear to be obvious, in view of the preponderating influence of the velocity, to raise the velocity to the greatest possible degree. It must, however, not be overlooked that velocity and pressure stand in a fixed mutual relationship, and that the gas velocity corresponds to a definite pressure drop which must be available. In addition, the gas velocity cannot be increased at will because of the resulting losses. It has been possible to reduce the losses by reconverting the produced velocity again into pressure, after completion of the separation, in the diffusor section of the channel, which is constructed in the form of a Venturi nozzle. However, the conversion of the pressure energy into flow energy and the repeated conversion of the flow energy into pressure energy is associated with unavoidable losses, to which must still be added the quite considerable friction, elbow and whirling losses which inevitably attend the flow of gases at high velocity. There thus results in a given condition of the gas to be purified, according to pressure and flow weight, an upper limit for the greatest velocity to be realized in the separation of the particles, and for the distance over which it may come into use, and whose further increase would only lead to a reduction in the economy of the process. The flow cross-sections to be made available are fixed by this limiting velocity for a given gas volume to be purified per unit of time.

The centripetal acceleration depends, as already mentioned, not only upon the velocity, but also upon the radius of curvature of the path of the particles to be separated; in other words, upon the radius of curvature of the median line of the coiled channel. The smaller this radius of curvature is, the greater will be the centripetal acceleration. As, however, the flow cross-sections for a given gas volume and pressure are fixed, the reduction of the radius of the core cannot be carried to any desired extent, since such reduction must be compensated by a corresponding increase in the radial depth of the channels to maintain the required flow area, and the radial depth cannot be increased at will for the reasons given below. This circumstance works out all the more disadvantageously since the radius that enters into the computation of the acceleration is not directly the radius of the core (or more exactly, the radius of the imaginary cylindrical surface on which the median lines of the channels lie, which radius is larger than that of the outer surface of the core), but rather the radius of curvature of the coiled channels, which latter radius is always larger than the radius even of the median lines, for the reason that the channels are arranged in helical fashion. The effective radius of curvature of the coiled channels corresponds not to the radius or to the radii of the surface of the body of revolution upon which the median lines of the coiled channels lie, but to the quotient of this radius and the square of the sine of that angle which the coiled channels make with the longitudinal axis of such surface of the body of revolution at any point. If this angle is 90°, then the channels run in a plane perpendicular to the longitudinal axis under consideration, and the effective radius of curvature of the channels assumes the most favorable minimum value equal to the radius of curvature of the imaginary cylinder above referred to, but at the same time the cross-section of the channels will become equal to zero, so that the realization of the theoretically smallest radius of curvature would, for this reason, be excluded from practical consideration. The smaller, on the other hand, the angle becomes, the greater do the channel cross-sections become the greater also their radius of curvature. Since a definite channel cross-section must be realized for the reasons already mentioned, there thus results also a practically attainable maximum value for the angle, and thus a practically attainable minimum effective radius of curvature of the channels, which minimum radius is considerably larger than the radius of the core member.

This mutual relationship between the channel cross-section and effective radius of curvature could be avoided by increasing the depth of the channels measured along the perpendicular to the longitudinal axis of the core or surface about which the channels are coiled, i. e. in the radial direction.

But even this possibility is limited, being subject to the mutual relationship between the flow velocity of the gases on the one hand and the viscosity of the gases and the centrifugal forces on the other. For, corresponding to the velocity of the gases, there is available to those particles, which by reason of their position in the region of the core 7, must traverse the whole radial channel depth before they can reach the outlets 2', 2'' arranged at the outer channel periphery, only a quite definite, extremely small time interval for such purpose. The smaller the particles to be separated, the more important a role does the viscosity of the gas play, and this must be overcome by the particles under the influence of the centrifugal forces exerted thereon to enable them to traverse the indicated path. Upon the basis of exact calculations, confirmed by experiment, a surprisingly large reduction of the advancing velocity of the particles was found to accompany a reduction in the size of the particles. If, therefore, the radial depth of the coiled channel is too great, then a considerable portion of the particles simply has no longer sufficient time during the strongly accelerated flow through the coiled channel to traverse the radial channel depth within the time interval determined by the flow velocity and the length of the channel, and reach the discharge openings 2', 2''. If, therefore, the efficiency of separation or purification is to be be maintained, a limited radial depth of the coiled channels must not be exceeded. This maximum depth can be determined either by simple experiment or by calculation.

The construction described above embodies my discovery that a mutual relationship exists between the friction, elbow and whirling losses on the one hand and the possibility on the other hand of suitably dimensioning the distance upon which the particles to be separated are subjected to a particularly high centrifugal action. The dimension is suitable when it makes possible that a particle lying even in the neighborhood of the core, finds enough time at a given velocity and viscosity of the gases on the one hand and with a given channel dimensioning on the other to reach the discharge opening under the influence of this greatest centripetal acceleration. For only in this way can the indicated losses be reduced to a value which does not prejudice the economy of the gas purification. If the place of greatest centripetal acceleration, which is attainable only by suitable dimensioning of the effective radius of curvature and with it the inclination of the channels to the longitudinal axis of the core, as well as of the flow velocity of the gases, were embodied in a larger channel length, as would occur, for example, in the case of coiled channel constructions of uniform but small pitch, then the elbow losses and likewise the whirling and friction losses would multiply in correspondence with the long distance over which the high flow velocity and the small radius of curvature are applied, without gaining anything in this way. According to the principles of the present invention, the distance over which the particles to be separated are subjected to a particularly high centrifugal force, i. e. the stretch over which the radius of curvature is small, is made no greater than is necessary to enable the particles, even when located at the inner periphery of the channels, that is, in the neighborhood of the core, and with a not too large radial channel depth and with a given viscosity and flow velocity of the gas particles, to be driven with certainty through the gas to the outer periphery of the coiled channel and be flung into the collecting openings for the particles.

The reduction in the pitch of the channels, with the accompanying decrease in the effective radius of curvature to a value more nearly equal to the radius of the core member 7, thus causes sufficient increase of the acceleration of the gases to insure that practically all particles will reach the outer periphery of the channels; and since the region of minimum pitch is of only small extent, it does not cause any material losses.

As shown in Fig. 1, the radial depth of the several channels is made small enough to enable particles at the inner radius of the channels to reach the limit of the outer radius, and hence the discharge openings 2', 2'' by making the diameter of the core 7 relatively large with respect to the inner diameter of the housing 1. Thus the core diameter may be made considerably more than half the inner diameter of the housing. In the preferred construction shown in Fig. 1, the annular space 12 is relatively narrow in comparison with the inner radius of the housing. Thereby higher gas velocities are created within the channels 10; while at the same time the reduction in pitch within only about one turn of the channels (i. e. within an angular distance of about 360°) is sufficient to create the necessary centrifugal forces to cause the particles to reach the discharge openings within the limited time allowed for their removal. This accounts for the fact that the apparatus of the invention is able to provide as efficient a purification of gases as, if not a higher degree of purification than, known separators employing Archimedean screws having many turns of uniform pitch.

If the reduction in cross-section in the initial or inlet portion of the channels, produced by the increase in the inclination of the channel walls, corresponds to the cross-section reduction in a tubular nozzle (of circular cross-section) with a conical angle of about 9° to the axis, and corresponds in the intermediate portion up to the narrowest cross-section to a tubular nozzle with a conical angle of about 1°, while the cross-sectional increase in the diffusor section of the channel corresponds to the cross-sectional increase of a tubular nozzle with approximately a 3° conical angle, there will be obtained, as experiments have shown, a particularly favorable relationship.

The curve $b$ in Fig. 4 wherein the ordinates represent centripetal gas acceleration, illustrates the extraordinarily high accelerations which can be secured by the narrowing of the channels with simultaneous decrease in the effective radius of curvature. As shown by the graph, an acceleration of about three thousand times the acceleration of gravity can be obtained. In contrast to devices with uniform inclination, that is, with constant angle $\alpha$, and as shown by the graph, not only can the initial angle for the coiled channels be made smaller, but there occurs additionally, up to the narrowest cross-section, a further increase of the angle of inclination up to the abovementioned angle of 65°. Since the sine of the angle increases correspondingly, the quotient of the core radius and the square of the sine (representing the effective radius of curvature) decreases, whereby an increase of the centripetal accelerations to about double results. In addition, the manufacture of this type of device is simplified and made cheaper as against the prior constructions; moreover they occupy less space than the latter and have a smaller weight.

In Fig. 4, there is indicated at which points the discharge openings 2', 2'' are arranged. Three of the openings 2', 2'' are arranged in advance of the narrowest cross-section 10'', while two channels suffice, after the point of greatest centripetal acceleration, to afford the last particles opportunity for separation.

It will be understood that suitable sealing devices will be associated with the discharge outlets 2' and 2'' to insure against the escape of the gases, a liquid trap, for example, in the form of a siphon, being highly satisfactory. This type of sealing is disclosed in the above mentioned application, and as it forms no part of the present invention, has not been illustrated in the drawings.

It will be noted that the discharge openings 2', 2'' are in the form of more or less annular slits which lie in planes which are approximately normal to the longitudinal axis of the apparatus. Each of the slits in the embodiment shown in Fig. 1 intersects a plurality of channels 10, 10''. The discharge conduits 3 leading from the discharge openings or slits, as will be clear from Fig. 1, are separate from each other, i. e. are not in communication, externally of the channels 10, 10'' and the housing 1, so that different pressures may prevail in these conduits. It will thus be obvious that the discharge openings and discharge conduits do not connect portions of the channels which are of different pressures, so that the proper pressure variations along the length of the apparatus are maintained.

If desired, the discharge ends of the channel walls 9 may be so constructed and mounted on the core as to lie at a slight angle to the longitudinal axis of the core so as to give a slight twist to the streams of gases discharging from the channels.

As already indicated, the above described apparatus is suitable for the separation both of liquid droplets, as well as of solid particles; and in the case of the latter, and particularly where they are of very small size, it is preferable to inject an atomized wash liquid into the stream of gases in advance of the separator mechanism in order to weight the particles. While the separator has been shown as comprising a plurality of channels, it will be obvious that for smaller capacities, fewer channels and even a single channel, constructed in the manner above described, can be employed.

Variations from the specific details hereinabove described by way of illustration may be resorted to within the scope of the appended claims without departing from the principles or spirit of the invention as defined in the subjoined claims.

I claim:

1. Apparatus for the purification of gases by removal of liquid or solid particles suspended therein, comprising an approximately helical channel through which the gases to be purified travel, the inclination of the side walls of the channel with respect to the longitudinal axis about which the channel is curved being of varying degree, and increasing from the inlet end of the channel to an intermediate section of the channel where a region of narrowest channel cross-section is provided, the inclination of the walls then decreasing from such narrowest cross-section toward the discharge end of the channel, and discharge openings in the outer periphery of the channel into which the suspended particles are flung by centrifugal force, the discharge openings comprising a series of axially spaced annular slits in the outer wall of the channels.

2. Apparatus for the purification of gases by removal of liquid or solid particles suspended therein through the action of centrifugal force, comprising an outer housing adapted to be connected to a gas conduit, a plurality of strips helically disposed within said housing to form Venturi-like channels coiled in approximately helical fashion, the median line of each of the channels making increasing and then decreasing angles with the longitudinal axis of the housing from the inlet toward the discharge end of the latter, and discharge openings for the suspended matter located in the outer walls of the respective channels, the discharge openings comprising annular slits in the outer wall of the channels, said slits lying in planes substantially normal to the longitudinal axis and each slit intersecting a plurality of channels.

HANS THEODOR HOLZWARTH.